UNITED STATES PATENT OFFICE.

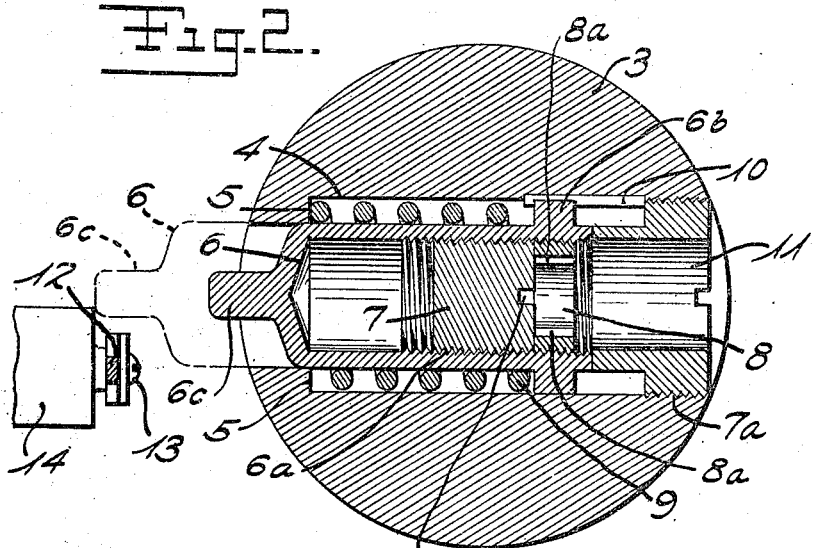
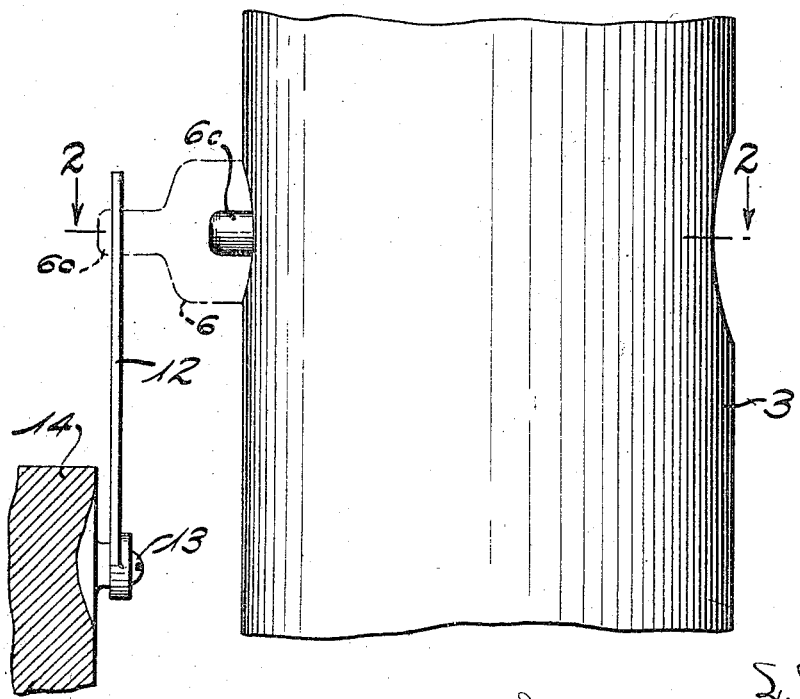

LYNDON B. TAYLOR, OF NEWPORT, RHODE ISLAND, ASSIGNOR TO THE GOVERNMENT OF THE UNITED STATES.

CENTRIFUGAL GOVERNOR.

1,296,138.  Specification of Letters Patent.  Patented Mar. 4, 1919.

Application filed April 17, 1917. Serial No. 162,784.

*To all whom it may concern:*

Be it known that I, LYNDON B. TAYLOR, a citizen of the United States, residing in the city of Newport, county of Newport, and State of Rhode Island, have invented certain new and useful Improvements in Centrifugal Governors; and I do hereby declare the following to be a full, clear, and exact description of the invention, such as will enable others skilled in the art to which it appertains to make and use the same.

This invention relates to centrifugally operated mechanisms, such as engine governors.

In such devices, a rotatory member carries a set of balls, a plunger or some equivalent weight device, which is moved away from the axis of rotation by centrifugal force against a suitable yielding resistance, as a spring, whereby when the rotatory member reaches a speed of a predetermined number of revolutions per minute, the plunger or its equivalent may do certain required work.

The particular object of the present invention is to provide an improved arrangement whereby a centrifugally operated mechanism, even after being permanently installed on its rotatory support, may be manually adjusted or readjusted to function when the support attains any one of a great number of possible rates of speed. In previous devices of this character, the usual construction has involved the use of a weight device of the plunger or sliding type, yieldingly held in inoperative position by means of a suitable spring. In all these previous devices, so far as I am aware, the adjustment of the weight device has been effected by varying the resiliency of this spring. This arrangement has some serious disadvantages, among which may be mentioned inconvenience and uncertainty of adjustment, unreliability in operation, and inability to make very fine adjustments unless the mechanism is unduly complicated or increased in size.

In every centrifugally operated mechanism, the center of gravity of the weight device is necessarily offset to some extent from the axis of rotation; otherwise of course the weight device would not be displaced no matter what the speed. It is also a fact that the less the distance between the center of gravity of the weight device and the axis of rotation of the rotatory member, other factors being equal, the greater the rate of speed which the rotatory member must attain before the weight device will be displaced a fixed distance. According to the present invention, means are provided whereby these other factors, and particularly the resiliency of the spring, are permitted to remain constant, if desired, while the location of the center of gravity of the weight device is varied as the special operating conditions of the moment require.

The invention involves the provision of a centrifugally operated weight device so mounted on a rotatory member that the center of gravity of the device may be adjusted very minutely to space the center of gravity a selected distance from the axis or rotation when the rotatory member is idle. This insures that the weight device will do its appointed work the instant the rotatory member reaches a rotating speed of the selected number of revolutions per minute. An important feature of the weight device thus constructed is the fact that the center of gravity variation is an operative feature of the device after its completed manufacture and final installation on the rotating member.

A further object of the invention is to provide a construction which is particularly adapted to be mounted in a housing carried by a rotatory member of the shaft type and within a housing arranged transverse to the axis of the shaft, the weight device being preferably of the spring-held plunger type. In this connection, a feature of the preferred construction is the provision of a weight device all the parts of which operate as one unit when subjected to the influence of centrifugal force: although these parts are, of course, preliminarily adjustable to predetermine the speed of rotation which will effect a given movement of the entire weight device, they will preferably be so arranged that they move as one unit parallel to each other and in the same direction. By means of a construction of this kind, the center of gravity of the weight device considered alone is not varied during the operation thereof under centrifugal force, and the mechanism may be very simple and compact, and convenient to mount on the rotatory member or to adjust and readjust after being thus mounted.

The invention will be more clearly understood from the following description when taken in connection with the accompanying drawing illustrating the invention, of which Figure 1 is a view in elevation, and Fig. 2 is a section on the line 2—2 of Fig. 1.

The rotatory member 3 is slotted as indicated to form a housing 4 for the weight device, the housing extending transverse to the axis of the rotatory member. Housing 4 is shouldered at 5 adjacent to one end, and is provided with internal threads at its other end.

The weight device comprises a plunger or slide-piece 6, a weight member 7, and a locking member 8. The slide-piece 6 acts as a support or carrier for the weight member, the latter having external threads which co-act with internal threads in the hollow portion 6ª of the slide-piece. The locking member 8 is formed as an annulus with exterior threads, these threads also coacting with the internal threads in the portion 6ª of the slide-piece. The weight member and the locking member are provided with kerfs 7ª and 8ª formed as shown so that both kerfs are always easily accessible and so that either member may be spirally adjusted independent of the other.

The means for mounting the weight device on the rotatory member comprises, in addition to the slot which forms the housing 4, an expansible coil-spring 9 surrounding the slide-piece and arranged between the internal shoulder 5 of the housing and the exterior shoulder 6ᵇ of the slide-piece, a key 10 by which the weight device is restrained against angular movement within the housing, and an end-plug 11 for limiting the extreme inward position of the weight device when the rotatory member is idle. This end-plug carries external threads which co-act with the internal threads at its end of the housing, and is of annular form so that after the weight device is permanently installed on the rotatory member a suitable tool may be passed through the bore of the end-plug to loosen the locking member 8, spirally adjust the weight member 7 and then tighten the locking member to clamp the weight member fast in its new location within the slide-piece. As a result of thus changing the positions of the weight member 7 and its locking member 8 on the slide-piece 6, the distance separating the axis of rotation of the rotatory member from the center of gravity of the entire weight device is varied as desired, and varied quickly and conveniently and with exceeding exactness, especially if the parts are suitably calibrated.

In operation, the weight device moves in the housing so as to project the nose 6ᶜ an amount sufficient to do the desired work when the speed of the rotatory member rises to the predetermined number of revolutions per minute. When thus projected the nose 6ᶜ may actuate a latch, engine governor or any other suitable device. In the drawing, a lever 12 is shown pivoted at 13 on a fixed support 14, arranged to be rocked by the nose 6ᶜ, to perform any required function, when the nose is projected as indicated in broken lines.

I claim:

1. In a device of the kind described, the combination of a rotatory member, a housing within the rotatory member and extending transverse to the axis of rotation of the rotatory member, a weight device slidably mounted in the housing, and means for yieldingly holding the weight device with its center of gravity spaced from the axis of rotation of the rotatory member when the latter is idle; the weight device including a slide-piece having threads and a weight member carried by the slide-piece and having threads coacting with the threads of the slide-piece, whereby the weight member may be spirally adjusted on the slide-piece to vary said predetermined distance when the rotatory member is idle; substantially as described.

2. In a device of the kind described, the combination of a rotatory member, a housing carried by the rotatory member and extending transverse to the axis of rotation of the rotatory member, a weight carrier slidably arranged in the housing and having a hollow internally threaded end facing one end of the housing, an externally threaded weight member adjustably mounted within the hollow threaded end of the weight carrier, and spring means coacting with the housing and weight carrier for holding the latter to a predetermined position within the housing when the rotatory member is idle; substantially as described.

3. In a device of the kind described, the combination of a rotatory member, a housing carried by the rotatory member and extending transverse to the axis of rotation of the rotatory member, a weight carrier slidably arranged in the housing and having a hollow internally threaded end facing one end of the housing, an externally threaded weight member adjustably mounted within the hollow threaded end of the weight carrier, an externally threaded locking member of annular form also adjustably mounted within the threaded hollow end of the weight carrier, and spring means coacting with the housing and weight carrier for holding the latter to a predetermined position within the housing when the rotatory member is idle; substantially as described.

4. The combination of a rotary shaft having a transverse opening therein, a weight located in the opening and movable under the influence of centrifugal force, a spring restraining outward movement of the weight, the weight consisting of a plurality of parts which are relatively adjustable to vary the distance between the center of gravity of the weight and the axis of rotation of said member when the member is at rest, and mechanism actuated by the movement of the weight; substantially as described.

5. The combination of a rotary shaft having a transverse opening therein, a weight located in the opening and movable under the influence of centrifugal force, a spring restraining outward movement of the weight, the weight consisting of a plurality of parts which have threaded engagement and which are adjustable relatively when the member is at rest in the direction of the axis of said transverse opening to vary the distance between the center of gravity of the weight and the axis of rotation of said member, and mechanism actuated by the movement of the weight; substantially as described.

6. The combination of a rotary shaft having a transverse opening therein, a weight located in the opening and movable under the influence of centrifugal force, a spring restraining the outward movement of the weight, the weight consisting of a plurality of parts which are adjustable relatively when the member is at rest to vary the distance between the center of gravity of the weight and the axis of rotation of said member, means for locking the parts of the weight in any selected position of relative adjustment, and mechanism actuated by the movement of the weight; substantially as described.

In testimony whereof I affix my signature.

LYNDON B. TAYLOR.

Copies of this patent may be obtained for five cents each, by addressing the "Commissioner of Patents. Washington, D. C."